No. 891,970. PATENTED JUNE 30, 1908.
H. ASKELI & F. PIETILA.
FLOOR CLEANING MACHINE.
APPLICATION FILED JAN. 29, 1908.
2 SHEETS—SHEET 2.
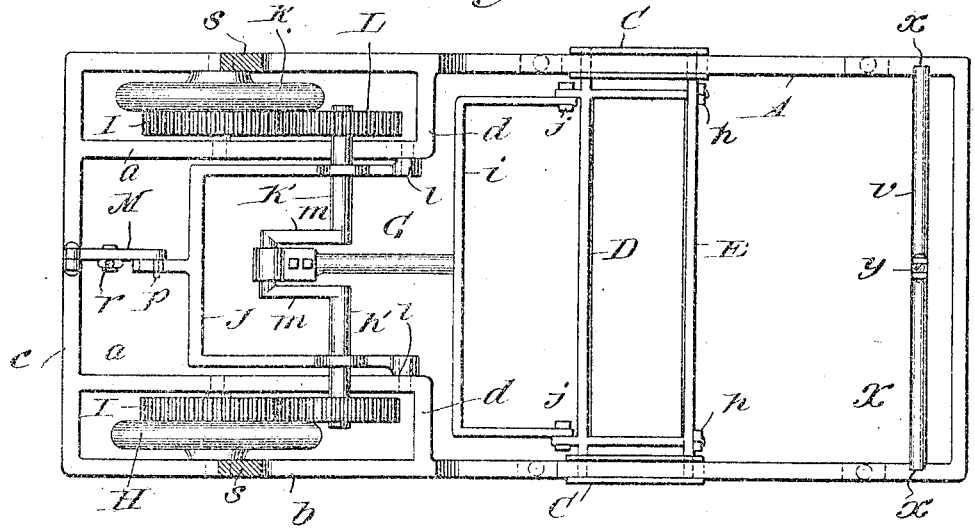
*Fig. 3.*
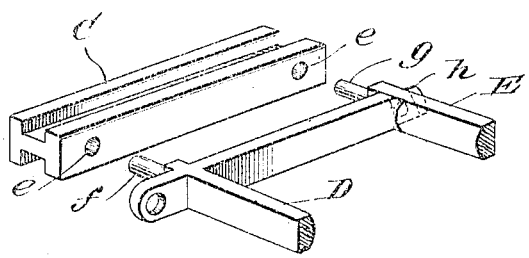
*Fig. 4.*
*Fig. 5.*
Witnesses
Phil E Barnes
J. J. Sheehy Jr.
Inventors
Henry Askeli +
Frank Pietila
By
James J. Sheehy
Attorney

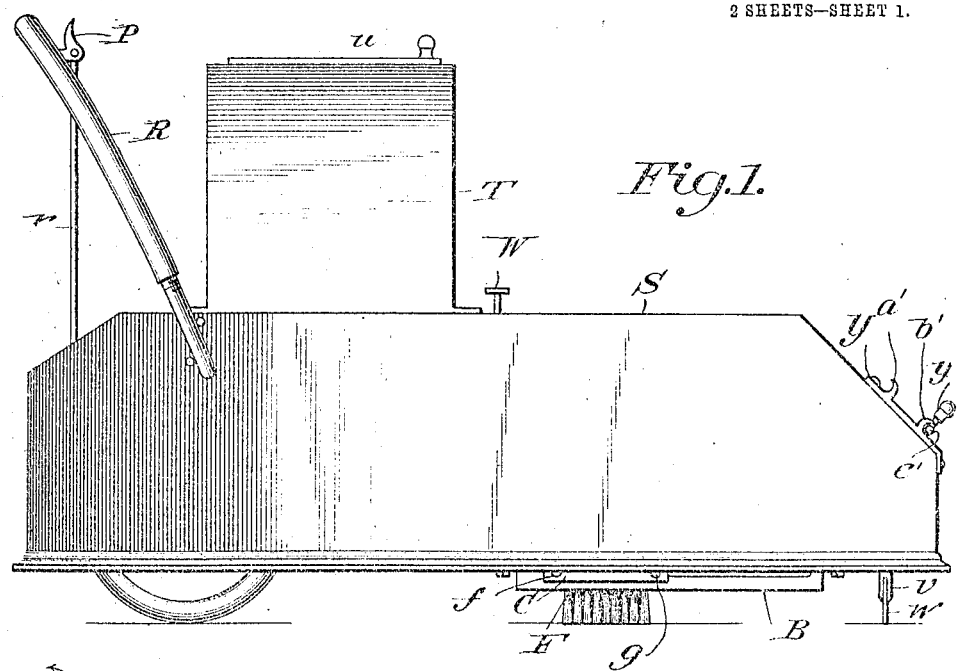
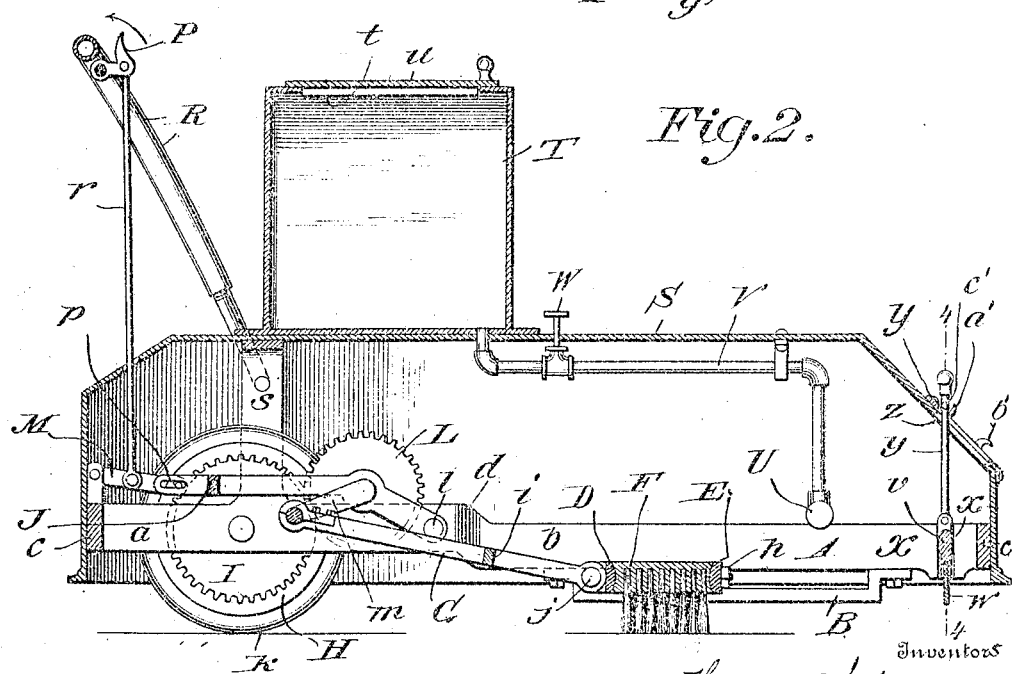

UNITED STATES PATENT OFFICE.

HENRY ASKELI AND FRANK PIETILA, OF EVERETT, WASHINGTON.

FLOOR-CLEANING MACHINE.

No. 891,970.  Specification of Letters Patent.  Patented June 30, 1908.

Application filed January 29, 1908. Serial No. 413,233.

*To all whom it may concern:*

Be it known that we, HENRY ASKELI and FRANK PIETILA, citizens of the United States, residing at Everett, in the county of Snohomish and State of Washington, have invented new and useful Improvements in Floor-Cleaning Machines, of which the following is a specification.

Our invention pertains to the washing of floors; and it has for its object to provide a simple and easily operated machine through the medium of which a floor may be expeditiously and thoroughly scrubbed and cleaned.

With the foregoing in mind the novelty, utility and practical advantages of the invention will be fully understood from the following description and claims when the same are read in connection with the drawings, accompanying and forming part of this specification, in which:

Figure 1 is a side elevation of a machine constituting the best practical embodiment of our invention of which we are cognizant. Fig. 2 is a longitudinal vertical section of the machine. Fig. 3 is a view partly in plan and partly in section of the machine with the hood and its appurtenances removed and with the brush and the handle of the scraper also removed. Fig. 4 is a transverse section taken in the plane indicated by the line 4—4 of Fig. 2, with some of the parts in elevation. Fig. 5 comprises disconnected perspective views of one of the slides and the adjacent portion of the brush-holder comprised in the machine.

Similar letters designate corresponding parts in all of the views of the drawings, referring to which:

A is the main frame of the machine, which is preferably rectangular in outline and is provided in its rear portion with longitudinal bars $a$ disposed parallel to its side bars $b$ and joined to its rear end bar $c$ and connected with the said side bars through transversely disposed portions or bars $d$.

B B are longitudinal bars disposed under and connected with the forward portions of the side bars $b$ of the main frame and arranged in combination with the said side bars to form guideways in which are arranged and movable slides C which are preferably of the form best shown in Fig. 5, and are provided with transverse apertures $e$. These latter are designed to receive studs $f$ and $g$ on the frame D and the removable cross-piece E, respectively, of a brush-holder. The said brush-holder is preferably of the form shown in Fig. 3, and the cross-piece E is detachably secured by nuts $h$ on the side bars of the frame D, and consequently it will be understood that when desired the brush F held in the holder may, when necessity demands, be readily removed and as readily replaced with a new brush. It will also be understood by reference to Fig. 2 that the inner side of the transverse bar of the frame D and the inner side of the cross-piece E are convex in cross-section and that the opposed sides of the head of brush F are concave, whereby casual upward or downward movements of the brush in the holder are precluded. As before stated, the slides C are movable in the guideways formed between the bars B and the side bars of the main frame A, and hence it follows that the brush F connected with the slides in the manner described is adapted to be reciprocated in the direction of the length of the machine.

For the purpose of reciprocating the brush holder and the brush incidental to movement of the machine over a floor, we provide the mechanism illustrated in Figs. 2 and 3. This mechanism comprises a pitman G having a bail-shaped portion $i$ pivoted at $j$ to ears on the transverse bar of the brush frame, traveling wheels H equipped, by preference, with rubber tires $k$ and mounted in the main frame between the longitudinally disposed bars $a$ and $b$ thereof, spur gears I arranged at the inner sides of the wheels H and fixed with respect to the same, a vertically swinging bail J pivoted at $l$ to the frame bars $a$, a transverse shaft K journaled in the side bars of the said bail and having a crank $m$ connected to the pitman G, and spur gears L fixed on the said shaft K and normally intermeshed with the spur gears I. By virtue of this construction it will be manifest that when the machine is pushed over a floor motion will be transmitted from the floor or traveling wheels H to the brush F and the latter will be rapidly and forcibly reciprocated over the floor with a view of quickly and thoroughly cleaning the latter.

It is desirable in some cases to move the machine without actuating the brush F in the manner described, and for this reason we mount the shaft K in the bail J and connect the said bail at $p$ with a vertically swinging arm M, which arm, in turn, is connected through a rod $r$ with a hand lever P mounted on a handle R which latter is fixed with respect to an inverted U-shaped upright $s$ formed integral with or fixed to the side bars $b$ of the main frame A. By moving the said hand lever P in the direction indicated by arrow in Fig. 2, the operator of the machine is enabled to quickly and easily raise the bail J and in that way disengage the spur gears L from the spur gears I and stop the reciprocation of the brush F, and in this connection it will be noticed that when the operator releases the hand lever P the bail J and the spur gears L will gravitate to the position shown in Fig. 2 to reestablish the driving connection between the traveling or floor wheels H and the brush F so that the latter will be reciprocated when the machine is moved.

S is a hood, preferably of sheet-metal, arranged over and fixed on the main frame A. T is a water tank arranged on and fixed to the hood S and having a filling opening $t$ and a door $u$ for normally closing the same. U is a transversely arranged pipe disposed slightly above the horizontal plane of the brush F and in advance of the same, and having a plurality of minute apertures in its under side at intervals of its length, and V is a pipe carried by the hood S and connecting the tank T and the pipe U and having a valve W for controlling the passage of water from the tank to the pipe U. With this construction it will be apparent that water may be sprayed on the floor that is being cleaned in advance of the scrubbing brush F so as to assist in the cleaning operation.

To further assist in the cleaning operation we provide the scraper X which comprises a body $v$ and a strip $w$ of elastic rubber or other material suitable to the purpose. The scraper body $v$ is arranged and adapted to be moved vertically in guideways $x$ formed in the side bars of the frame A, and to the said body $v$ a handle rod $y$ is pivotally connected. The said handle rod $y$ extends upward through a slot $z$ in the hood and also through a slotted plate Y fixed on the hood, which plate is provided with hooks $a'$ and $b'$ for the engagement of a lateral projection $c'$ on the handle rod. By virtue of this construction it will be seen that the scraper may be readily raised and lowered, and that by engaging the lateral projection $c'$ on the handle rod $y$ with the hook $a'$ the scraper may be maintained in its raised and idle position, while by moving the scraper downward and engaging the lateral projection $c'$ with the hook $b'$, the scraper may be secured in its working position and against casual upward movement.

In this connection it will be noticed that in Fig. 1 the scraper is shown as secured in its depressed and working position and that in Fig. 2 the scraper is shown as fastened in its raised and idle position.

It will be gathered from the foregoing that through the medium of our novel machine a floor may be quickly and thoroughly scrubbed, washed and cleaned, and this with but a minimum amount of effort on the part of the person moving the machine; and it will also be appreciated that the machine is simple and inexpensive in construction and yet well adapted to withstand the rough usage to which machines of corresponding character are ordinarily subjected.

As stated in the foregoing the construction herein illustrated and described constitutes the best embodiment of our invention known to us, but it is obvious that in the future practice of the invention such changes in the form, construction, and relative arrangement of parts may be made as fairly fall within the scope of our invention as defined in the claims appended.

Having described our invention, what we claim and desire to secure by Letters-Patent, is:

1. In a machine for the purpose described, the combination of a wheel-supported frame having longitudinal guideways, slides movable in said guideways, a brush holder connected to and movable with the slides, a gear rotatable with the frame supporting wheels, a bail pivotally connected with the frame, means for raising said bail, a crank-shaft journaled in the bail and having a gear normally engaged with the first mentioned gear, and a pitman connecting the brush holder with the crank-shaft.

2. In a machine for the purpose described, the combination of a frame having side bars and also having longitudinally disposed bars arranged between the rear portions of the side bars and fixed with respect thereto, traveling wheels mounted between the side bars and the other longitudinal bars of the frame and provided with spur gears, longitudinally movable slides guided in the frame, a brush holder connected with and carried by said slides, a bail pivoted to the inner longitudinal bars of the frame, means for raising the said bail, a shaft journaled in the bail and having a crank and also having spur gears intermeshed with the first mentioned spur gears, and a pitman connecting the brush holder and the crank of the shaft.

3. In a machine for the purpose described, the combination of a frame having vertical guideways, a hood arranged on the frame and having an inclined portion in which is a slot extending in the direction of the incline, oppositely disposed hooks on the inclined portion of the hood at the upper and lower ends of the slot, a scraper movable vertically in said guideways of the frame, and a handle rod pivoted to the scraper and extending through the slot in the hood and having a projection to be placed in engagement with one of the said hooks when the rod is in its extreme pivotal position for the purpose described.

In testimony whereof we have hereunto set our hands in presence of two subscribing witnesses.

HENRY ASKELI.
FRANK PIETILA.

Witnesses:
 TOM LINDALL,
 B. E. PADGETT